United States Patent
McDowall et al.

(10) Patent No.: US 11,665,139 B2
(45) Date of Patent: May 30, 2023

(54) DISTRIBUTED OFFLOAD LEVERAGING DIFFERENT OFFLOAD DEVICES

(71) Applicant: Palo Alto Networks, Inc., Santa Clara, CA (US)

(72) Inventors: John Edward McDowall, Redwood City, CA (US); James Sugg, San Jose, CA (US); Charles Bransi, Los Altos Hills, CA (US)

(73) Assignee: Palo Alto Networks, Inc., Santa Clara, CA (US)

( * ) Notice: Subject to any disclaimer, the term of this patent is extended or adjusted under 35 U.S.C. 154(b) by 0 days.

(21) Appl. No.: 17/246,160

(22) Filed: Apr. 30, 2021

(65) Prior Publication Data

US 2022/0353240 A1    Nov. 3, 2022

(51) Int. Cl.
*H04L 9/40*    (2022.01)

(52) U.S. Cl.
CPC .......... *H04L 63/0227* (2013.01); *H04L 63/02* (2013.01)

(58) Field of Classification Search
CPC ............................. H04L 63/0227; H04L 63/02
See application file for complete search history.

(56) References Cited

U.S. PATENT DOCUMENTS

| | | | | |
|---|---|---|---|---|
| 8,612,612 | B1* | 12/2013 | Dukes | H04L 67/141 709/203 |
| 10,374,871 | B2 | 8/2019 | Ramachandran | |
| 2004/0193943 | A1* | 9/2004 | Angelino | H04L 41/0631 714/4.1 |
| 2016/0269371 | A1* | 9/2016 | Coimbatore | H04L 9/0833 |
| 2019/0394170 | A1* | 12/2019 | Shameli-Sendi | H04L 63/0263 |
| 2020/0274852 | A1* | 8/2020 | Ahmed | H04L 63/0209 |
| 2020/0396164 | A1* | 12/2020 | Arimanda | H04L 47/12 |

OTHER PUBLICATIONS

Author Unknown, Generic Flow API (rte_flow)—Data Plane Development Kit 21.05.0-rc1 documentation, downloaded Apr. 22, 2021.
Github, sessionOffload/GeneveOpenOffload.md at master-att/sessionOffload, downloaded Apr. 21, 2021.
Github, sessionOffload/openoffload.proto at v1beta1-att/sessionOffload, Apr. 30, 2021.
Gross et al., RFC 8926—Geneve: Generic Network Virtualization Encapsulation, Internet Engineering Task Force (IETF), Nov. 2020.
NVIDIA, NVIDIA Mellanox Bluefield-2, Data Processing Unit (DPU), Product Brief, Aug. 2020.
Palo Alto Networks, APP-ID, Technology Brief, pp. 1-5, downloaded Apr. 21, 2021.

* cited by examiner

*Primary Examiner* — Huan V Doan

(74) *Attorney, Agent, or Firm* — Van Pelt, Yi & James LLP

(57) ABSTRACT

Techniques for distributed offload leveraging different offload devices are disclosed. In some embodiments, a system, process, and/or computer program product for distributed offload leveraging different offload devices includes receiving a flow at a firewall of a security service (e.g., a cloud-based security service); inspecting the flow at the firewall to determine meta information associated with the flow; and offloading the flow to an offload entity (e.g., a SmartNIC, software executed on a Network Interface Card (NIC), and/or a network device, such as a network router and/or network switch) based on the meta information associated with the flow (e.g., an application identification associated with the flow determined using deep packet inspection) and based on a policy.

20 Claims, 11 Drawing Sheets

US 11,665,139 B2

DISTRIBUTED OFFLOAD LEVERAGING DIFFERENT OFFLOAD DEVICES

BACKGROUND OF THE INVENTION

A firewall generally protects networks from unauthorized access while permitting authorized communications to pass through the firewall. A firewall is typically a device or a set of devices, or software executed on a device, such as a computer, that provides a firewall function for network access. For example, firewalls can be integrated into operating systems of devices (e.g., computers, smart phones, or other types of network communication capable devices). Firewalls can also be integrated into or executed as software on computer servers, gateways, network/routing devices (e.g., network routers), or data appliances (e.g., security appliances or other types of special purpose devices).

Firewalls typically deny or permit network transmission based on a set of rules. These sets of rules are often referred to as policies. For example, a firewall can filter inbound traffic by applying a set of rules or policies. A firewall can also filter outbound traffic by applying a set of rules or policies. Firewalls can also be capable of performing basic routing functions.

BRIEF DESCRIPTION OF THE DRAWINGS

Various embodiments of the invention are disclosed in the following detailed description and the accompanying drawings.

DETAILED DESCRIPTION

Figure 1:
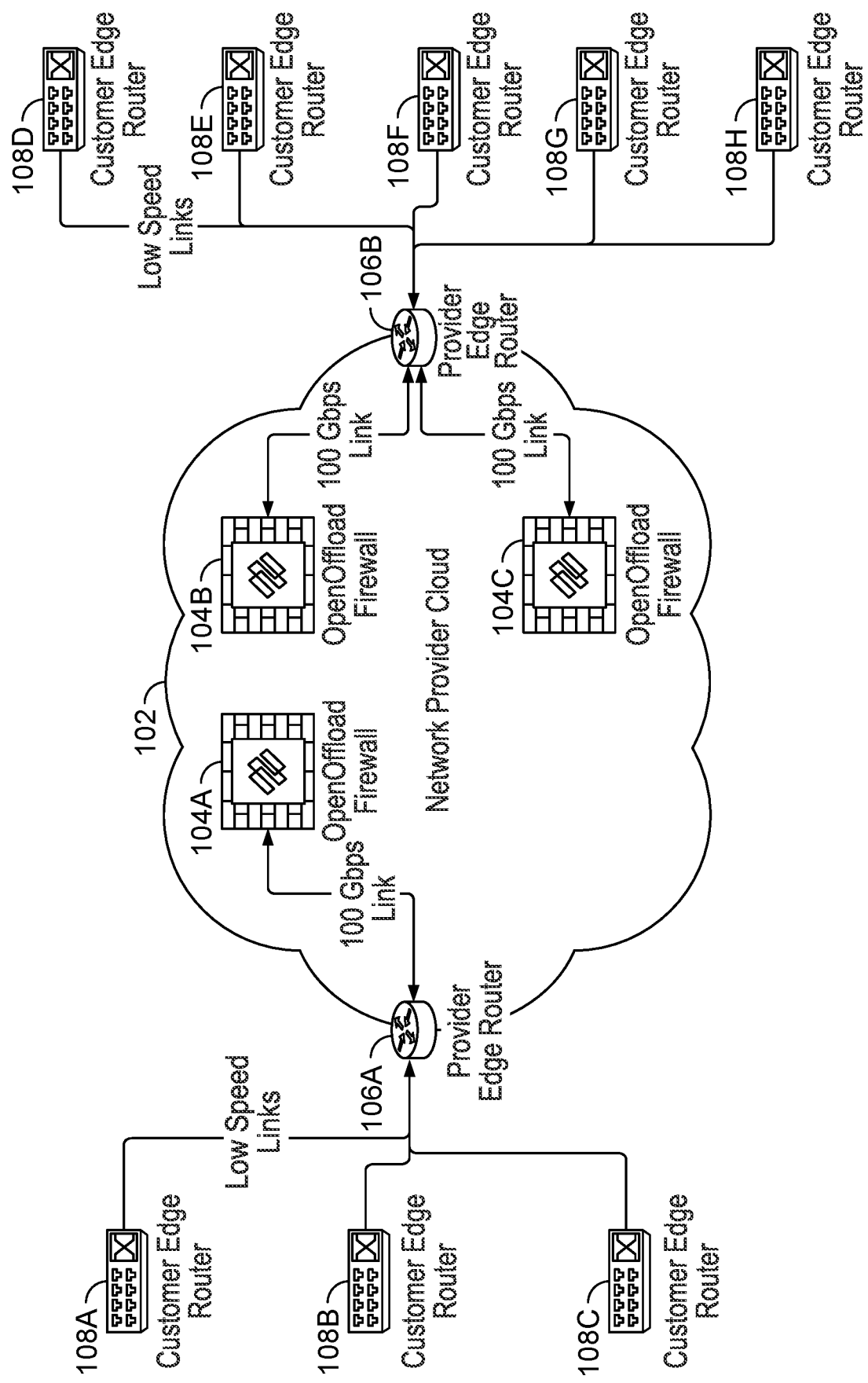
FIG. 1 is a network diagram of a system for distributed offload leveraging different offload devices in accordance with some embodiments.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications, and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Advanced or Next Generation Firewalls

Malware is a general term commonly used to refer to malicious software (e.g., including a variety of hostile, intrusive, and/or otherwise unwanted software). Malware can be in the form of code, scripts, active content, and/or other software. Example uses of malware include disrupting computer and/or network operations, stealing proprietary information (e.g., confidential information, such as identity, financial, and/or intellectual property related information), and/or gaining access to private/proprietary computer systems and/or computer networks. Unfortunately, as techniques are developed to help detect and mitigate malware, nefarious authors find ways to circumvent such efforts. Accordingly, there is an ongoing need for improvements to techniques for identifying and mitigating malware.

A firewall generally protects networks from unauthorized access while permitting authorized communications to pass through the firewall. A firewall is typically a device, a set of devices, or software executed on a device that provides a firewall function for network access. For example, a firewall can be integrated into operating systems of devices (e.g., computers, smart phones, or other types of network communication capable devices). A firewall can also be integrated into or executed as software applications on various types of devices or security devices, such as computer servers, gateways, network/routing devices (e.g., network routers), or data appliances (e.g., security appliances or other types of special purpose devices, and in some implementations, certain operations can be implemented in special purpose hardware, such as an ASIC or FPGA).

Firewalls typically deny or permit network transmission based on a set of rules. These sets of rules are often referred to as policies (e.g., network policies or network security policies). For example, a firewall can filter inbound traffic by applying a set of rules or policies to prevent unwanted outside traffic from reaching protected devices. A firewall can also filter outbound traffic by applying a set of rules or policies (e.g., allow, block, monitor, notify or log, and/or other actions can be specified in firewall rules or firewall policies, which can be triggered based on various criteria, such as described herein). A firewall can also filter local network (e.g., intranet) traffic by similarly applying a set of rules or policies.

Security devices (e.g., security appliances, security gateways, security services, and/or other security devices) can perform various security operations (e.g., firewall, anti-malware, intrusion prevention/detection, proxy, and/or other security functions), networking functions (e.g., routing, Quality of Service (QoS), workload balancing of network related resources, and/or other networking functions), and/or other security and/or networking related operations. For example, routing can be performed based on source information (e.g., IP address and port), destination information (e.g., IP address and port), and protocol information (e.g., layer-3 IP-based routing).

A basic packet filtering firewall filters network communication traffic by inspecting individual packets transmitted over a network (e.g., packet filtering firewalls or first generation firewalls, which are stateless packet filtering firewalls). Stateless packet filtering firewalls typically inspect the individual packets themselves and apply rules based on the inspected packets (e.g., using a combination of a packet's source and destination address information, protocol information, and a port number).

Application firewalls can also perform application layer filtering (e.g., using application layer filtering firewalls or second generation firewalls, which work on the application level of the TCP/IP stack). Application layer filtering firewalls or application firewalls can generally identify certain applications and protocols (e.g., web browsing using Hyper-Text Transfer Protocol (HTTP), a Domain Name System (DNS) request, a file transfer using File Transfer Protocol (FTP), and various other types of applications and other protocols, such as Telnet, DHCP, TCP, UDP, and TFTP (GSS)). For example, application firewalls can block unauthorized protocols that attempt to communicate over a standard port (e.g., an unauthorized/out of policy protocol attempting to sneak through by using a non-standard port for that protocol can generally be identified using application firewalls).

Stateful firewalls can also perform stateful-based packet inspection in which each packet is examined within the context of a series of packets associated with that network transmission's flow of packets/packet flow (e.g., stateful firewalls or third generation firewalls). This firewall technique is generally referred to as a stateful packet inspection as it maintains records of all connections passing through the firewall and is able to determine whether a packet is the start of a new connection, a part of an existing connection, or is an invalid packet. For example, the state of a connection can itself be one of the criteria that triggers a rule within a policy.

Advanced or next generation firewalls can perform stateless and stateful packet filtering and application layer filtering as discussed above. Next generation firewalls can also perform additional firewall techniques. For example, certain newer firewalls sometimes referred to as advanced or next generation firewalls can also identify users and content. In particular, certain next generation firewalls are expanding the list of applications that these firewalls can automatically identify to thousands of applications. Examples of such next generation firewalls are commercially available from Palo Alto Networks, Inc. (e.g., Palo Alto Networks' PA Series firewalls).

For example, Palo Alto Networks' next generation firewalls enable enterprises to identify and control applications, users, and content—not just ports, IP addresses, and packets—using various identification technologies, such as the following: APP-ID for accurate application identification, User-ID for user identification (e.g., by user or user group), and Content-ID for real-time content scanning (e.g., controls web surfing and limits data and file transfers). These identification technologies allow enterprises to securely enable application usage using business-relevant concepts, instead of following the traditional approach offered by traditional port-blocking firewalls. Also, special purpose hardware for next generation firewalls implemented, for example, as dedicated appliances generally provide higher performance levels for application inspection than software executed on general purpose hardware (e.g., such as security appliances provided by Palo Alto Networks, Inc., which utilize dedicated, function specific processing that is tightly integrated with a single-pass software engine to maximize network throughput while minimizing latency).

Advanced or next generation firewalls can also be implemented using virtualized firewalls. Examples of such next generation firewalls are commercially available from Palo Alto Networks, Inc. (e.g., Palo Alto Networks' firewalls, which support various commercial virtualized environments, including, for example, VMware® ESXi™ and NSX™, Citrix® Netscaler SDX™, KVM/OpenStack (Centos/RHEL, Ubuntu®), and Amazon Web Services (AWS)). For example, virtualized firewalls can support similar or the exact same next-generation firewall and advanced threat prevention features available in physical form factor appliances, allowing enterprises to safely enable applications flowing into and across their private, public, and hybrid cloud computing environments. Automation features such as VM monitoring, dynamic address groups, and a REST-based API allow enterprises to proactively monitor VM changes dynamically feeding that context into security policies, thereby eliminating the policy lag that may occur when VMs change.

Technical Challenges for Security Solutions in Increasing Bandwidth Network Environments Security service providers offer various commercially available security solutions including various firewall, VPN, and other security related services. For example, some security service providers provide their customers with such security solutions including various firewall, VPN, and other security related services. However, the increasing bandwidth network environments (e.g., enterprise network environments with 100 Gigabyte (100G) links) present technical challenges for such security solutions.

Specifically, what is needed are new and improved solutions to efficiently facilitate high throughput for such security solutions. For example, private and public cloud networks are moving towards 100G or higher speed networks (e.g., networks with 100G or higher speed links). As a result, it is increasingly expensive to provide virtual security solutions (e.g., at 100G or higher speeds, such as virtual security solutions for commercially available Palo Alto Networks' firewalls, which are provided using various commercial virtualized environments, including, for example, VMware® ESXi™ and NSX™, Citrix® Netscaler SDX™, KVM/OpenStack (Centos/RHEL, Ubuntu®), and Amazon Web Services (AWS) or for various other commercially available firewall solutions). An example existing approach is to attempt to offload with a VM/CN-Series virtualized environment that is in user space. However, this approach is expensive in terms of computing resources utilized for such offloading operations.

Overview of Techniques for Distributed Offload Leveraging Different Offload Devices Accordingly, various techniques for providing distributed offload leveraging different offload devices are disclosed.

In some embodiments, a system, process, and/or computer program product for distributed offload leveraging different offload devices includes receiving a flow at a firewall of a security service (e.g., a cloud-based security service); inspecting the flow at the firewall to determine meta information associated with the flow; and offloading the flow to an offload entity (e.g., a SmartNIC, software executed on a Network Interface Card (NIC), and/or a network device, such as a network router or network switch) based on the meta information associated with the flow (e.g., an application identification associated with the flow determined using deep packet inspection) and based on a policy (e.g., an offload policy, such as further described below).

In some embodiments, a system, process, and/or computer program product for distributed offload leveraging different offload devices further includes closing the flow; and receiving session statistics associated with the flow from the offload entity.

For example, the disclosed techniques for providing distributed offload leveraging different offload devices substantially increase the capacity of security devices (e.g., Palo Alto Networks VM/CN-Series platforms or other commercially available security platforms) by offloading flows that are Layer-7 (L7) complete to an offload entity, such as using a SmartNIC, software executed on a NIC, and/or network devices (e.g., routers, switches, etc.) to facilitate the handling of high bandwidth network environments (e.g., to handle 100G links) as will be further described below.

In an example implementation for providing distributed offload leveraging different offload devices, the disclosed techniques implement an effective and efficient offload of a selected flow based on an offload policy before packets enter the Linux kernel of either the container or virtual firewall. For example, this results in a significant reduction in load on the overall system for flows that have early actions decided.

The disclosed techniques providing distributed offload leveraging different offload devices can be applied to any deployment for enhanced security solutions. As an example, the disclosed techniques can be applied to high bandwidth network environments, such as service provider network environments. Specifically, service provider deployments (e.g., AT&T, Verizon, or other commercially available service cellular and/or Internet/network service provider deployments) generally are associated with high bandwidth network environments (e.g., such service providers typically desire very high throughput (e.g., 100 Gbps)). Service provider deployments are also generally associated with network environments in which a majority of the network traffic is typically passthrough traffic (e.g., elephant flows). As such, a significant percentage of the network traffic in service provider networks is within a smaller number of flows that have the potential to be bypassed for security inspection (e.g., in an example service provider network, about 80% of the network traffic can be offloaded as that is the percentage of elephant flows that are passing across this example service provider network). These elephant flows are typically video streams (e.g., video streaming using Netflix, YouTube, etc.) and/or video conferencing (e.g., video conferencing using Zoom, WebEx, etc.).

Other example types of network traffic that can be effectively offloaded using the disclosed techniques include SSH, SSL, and IPSEC associated network traffic that is encrypted using these or other encrypted network protocols. Given that service providers are typically in the middle of the flows between their customers, the service providers generally would not have the necessary keys to inspect such encrypted network traffic and, as such, this encrypted traffic can also be effectively offloaded using the disclosed techniques. Various other types of network traffic can similarly be effectively offloaded using the disclosed techniques.

In an example implementation, the Open Offload Firewalls (e.g., offload devices/entities) can be configured with a distributed policy. Specifically, the network/security policy can be distributed to such offload devices, in which the offload devices can be implemented using distributed software (e.g., CN-Series and/or VM-Series firewalls) or physical devices as similarly described herein. As further described below, the communication with the CN-Series and/or VM-Series firewalls can be over a network tunnel (e.g., which enables the enforcement point to be remote from the decision point). As also further described below, the offload devices can also be implemented using a SmartNIC network device.

In an example implementation, a secure bypass is provided using the offload devices. A common approach is to select flows to bypass the firewall to reduce the load on the firewall. This is typically implemented by setting Access Control Lists (ACLs) on network devices. However, using ACLs is generally not a secure approach to performing such selection of flows to bypass the firewalls. As such, the disclosed techniques include a secure bypass solution that enables inspection and validation before offloading the flows for bypass as will be further described below.

In an example implementation, an open/public Application Programming Interface (API) is used for communicating with the firewalls. As an example, using an open/public API allows multiple offload devices to be integrated into the firewall with no changes to the firewall. This facilitates a pluggable model for extending the system into new hardware and distributed locations as will be further described below.

In an example implementation, an extensible policy (e.g., extensible network/security policy) is used for configuring the firewalls. For example, an open/public API can be extended with a new security policy with minimal changes, allowing more security policy configurations to be distributed to the firewalls/offload devices as will be further described below.

In an example implementation, a standard tunnel format is used for communicating with the firewalls. As an example, for network devices, an open/standard Geneve tunnel format is defined (e.g., an open offload Geneve format is available at github.com/att/sessionOffload/blob/master/doc/GeneveOpenOffload.md to allow the firewall to observe/monitor the actual source/destination traffic. This provides higher degrees of security to the distributed device(s) as will be further described below. This enables the external device (e.g., a router) to make routing decisions and transmit the ingress/egress port through the firewall back to the external device for delivery. Other information such as a VLAN ID enables differentiation of traffic by mapping, for example, a customer ID to a VLAN-ID allow per a security policy.

In an example implementation, the zone model extends to the offload device rather than the firewall enabling distributed policy to multiple end points from a single firewall as will be further described below.

As such, the disclosed techniques can be implemented to enable the distribution of a network/security policy to endpoints from a central firewall (e.g., the network/security policy can be distributed to offload devices, which can include distributed software and/or distributed physical devices).

The disclosed techniques also provide an enhanced security solution that generally does not require specific hardware. The disclosed techniques are also easy to deploy (e.g., without a requirement for unnecessarily complex deployments).

In addition, the disclosed techniques can efficiently scale from low end (e.g., using software) to high end (e.g., using network devices); for example, the disclosed techniques provide the ability to scale VM/CN-Series firewalls to several times the existing scale utilizing the same computing resources.

Also, the disclosed techniques facilitate firewall integration in complex environments by providing a well-defined demarcation between the firewall and the offload hardware.

Further, the disclosed techniques allow for customer selection of offload hardware without the requirement for extensive, custom integration and testing for each new offload device.

Finally, the disclosed techniques facilitate a transparent offload solution (e.g., the disclosed offload architecture can be used in a variety of different deployment models as further described below) as the only difference that would be apparent to an end user would generally just be the performance and scale of their service provider network.

Accordingly, various techniques for providing distributed offload leveraging different offload devices are disclosed as will also be further described below.

Example System Embodiments for Distributed Offload Leveraging Different Offload Devices FIG. 1 is a network diagram of a system for distributed offload leveraging different offload devices in accordance with some embodiments. Referring to FIG. 1, a Network Provider Cloud 102 includes Open Offload Firewalls 104A, 104B, and 104C as shown. As also shown, Customer Edge Routers 108A-C and 108D-H are in network communication via Low Speed Links to Provider Edge Routers 106A and 106B, respectively. Provider Edge Router 106A is in network communication with Open Offload Firewall 104A via a High Speed Link, shown as a 100 Gps Link. Similarly, Provider Edge Router 106B is in network communication with Open Offload Firewalls 104B and 104C via High Speed Links, shown as 100Gps Links. For example, the disclosed techniques for distributed offload using Open Offload Firewalls 104A-C can significantly reduce the number of firewalls required for the network provider cloud environment 102, which can effectively lower both the capital expenditures (CAPEX) and operating expenses (OPEX) for network providers.

In one embodiment, for a distributed network element (e.g., the offload device), a mechanism is provided to forward traffic flows to a firewall using a secure tunnel (e.g., the tunnel may or may not be secure, however, the goal of the tunnel is to convey routing information, which the firewall translates to zones, and it also can contain a VLAN ID, which can translate to customer identifiers) (e.g., in some cases, the tunnel can be implemented using a standard Geneve tunnel) that encapsulates the original flow and keeps the original 5-tuple. The Geneve tunnel metadata adds a new field called inLif and outLif that defines the source zone and destination zone. In this example implementation, the zones are defined by the offload device, not by the interface on the firewall. This enables distributed policy at the offload device. The new flow is processed by the firewall and a session is created. The firewall uses different heuristics and its security engine to identify a session to be offloaded. The Firewall notifies the offload device to add a session. The offload device applies the forward policy (e.g., Forward, Drop, Firewall (FW), and/or other policies can similarly be applied) to the flow according to the policy decision of the firewall. When the offload device matches a flow, the packet is forwarded without being sent to the firewall except when it is a TCP control packet or a fragmented packet. The offload device session is configured to time out after some inactivity and notifies the firewall with the session ID and the statistics of the flow. The firewall keeps track of all sessions. When control packets indicated a session is terminated, the firewall can remove the flow after a predetermined/configurable period of time and ensure that the statistics are gathered for the session (e.g., for the firewall session/traffic logs). Once the session is removed from the offload device, and the session timed out in the Firewall, the session is removed.

The disclosed techniques are flexible and can work for any deployment of, for example, virtual-based and/or container-based firewalls (e.g., Palo Alto Networks VM-Series or CN-Series firewalls or other commercially available virtual-based or container-based firewalls), where there is traffic that can be sent to the fast path after classification of the traffic based on the application type (e.g., in which the application identification (APP-ID) associated with the flow is determined using deep packet inspection (DPI)). If all traffic requires threat inspection, then the offload generally provides limited value. However, if a significant portion of traffic only requires inspection to determine the application type (APP-ID as provided by the Palo Alto Networks VM-Series and CN-Series firewalls), then the fast path can provide a significant throughput boost as all the computation cycles saved can be used for packet processing and additional firewall performance.

In an example implementation, users can register and activate an offload device in the virtual-based and/or container-based firewalls. The device can be either software or hardware (e.g., using a SmartNIC) as will be further described below. Once the offload has been enabled, the control of which flows to offload is controlled through an offload session API. Once the offload device has closed the flow, the resulting statistics and notification of the end of flow are sent over a statistics API. Example reporting can include statistics related to the number of offload sessions and volume of traffic, in a management interface.

The disclosed techniques for providing distributed offload leveraging different offload devices can significantly improve scalability and performance for security services by reducing the compute resources (e.g., CPU and memory utilization) to facilitate higher bandwidth traffic flows on service provider or other enterprise networks. For example, such distributed offloading techniques are effective for network environments in which there is sufficient traffic that is elephant flows that can be offloaded. Offloaded traffic does not need to traverse the Linux stack from driver space to user space to enable a fast path (e.g., the fast path can be implemented at a minimum at the network interface), such as will be further described below with respect to FIGS. 2A-B.

In an example implementation, an elephant flow can be detected by the firewall (e.g., using a PAN-OS of a commercially available firewall from Palo Alto Networks, Inc. headquartered in Santa Clara, Calif.) as will now be described. First, the firewall determines if the flow does not have any threats (e.g., based on one or more threat models) that need to be further inspected. If this is true, then the flow is marked as "L7 complete". This signals that the firewall has determined the flow application identifier (APP-ID) and as there are no threats it does not need to do further processing on the flow. Once the flow enters the "L7 complete state", the firewall checks to see if the flow has more than X packets and that packets arrive at least at a rate of Y packets per second. The values of X and Y are configurable by the firewall administrator to allow customization of their enterprise network environments. An example default value for X is 95 and an example default value for Y is 8. For example, these two parameters can be configured to ensure that the flow is both sufficiently long and arriving at a high enough rate to make offloading worthwhile. As such, the parameters X and Y are user configurable to allow the system administrator to make a value judgement on what is worthwhile for such offloading in their enterprise network environments. In this example implementation, to provide further control, the system also allows the administrator to override the threat analysis and offload flows that would otherwise have threat analysis performed (e.g., which some experienced security/network administrators may choose for certain configurations and contexts in their enterprise network environments).

Figure 2A:
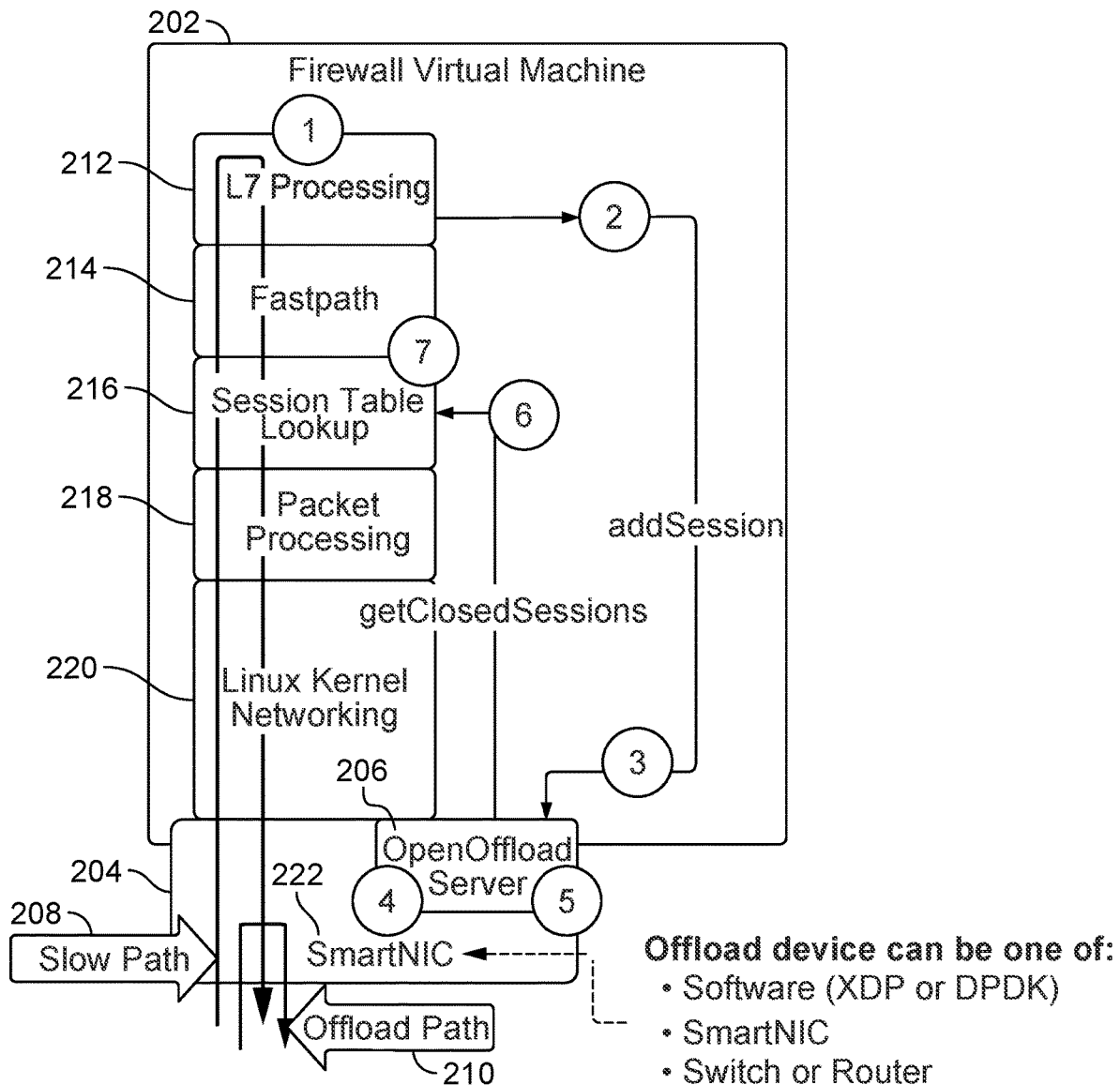
FIG. 2A is a functional block diagram of a system architecture for providing distributed offload leveraging different offload devices in accordance with some embodiments.

FIG. 2A is a functional block diagram of a system architecture for providing distributed offload leveraging different offload devices in accordance with some embodiments. As shown, a Firewall Virtual Machine 202 includes components for processing network traffic, such as a Linux Kernel Networking component 220, a Packet Processing component 218, a Session Table Lookup component 216, a Fastpath component 214, and an L7 Processing component (e.g., APP-ID) 212. As also shown, Firewall Virtual Machine 202 includes an OpenOffload Server 206 for offloading certain types of network traffic (e.g., elephant flows and/or other types of network traffic). Specifically, FIG. 2A illustrates Firewall Virtual Machine 202 (e.g., a container-based firewall can be similarly implemented) that is configured for providing distributed offload leveraging different offload devices to facilitate an Offload Path 210 as an alternative to a Slow Path 208 for certain types of network traffic (e.g., selected flows) as will now be described.

Referring to FIG. 2A, at stage 1, Firewall Virtual Machine 202 detects an L7 complete elephant flow using an L7 Processing component 212 (e.g., APP-ID). At stage 2, Firewall Virtual Machine 202 invokes an addSession call (e.g., using a gRPC call, which can be implemented as an open interface, such as the APIs published and defined as a set of gRPC interfaces that are publicly available at https://github.com/att/sessionOffload/blob/v1beta1/protos/openoffload.proto) to an OpenOffload Server 206 with the session ID and 6-tuple information (e.g., or 5-tuple, in which these 5-/6-tuples can include IP source/destination, port source/destination, protocol, and (optionally for 6-tuples) VLAN ID) associated with the session. At stage 3, OpenOffload Server 206 checks that a session ID does not exist, and if it does not exist, then it is added to the OpenOffload Session Table (not shown). In an example implementation, the offload device is responsible for mapping the firewall session ID to the offload device's internal session table (e.g., this allows the offload device the flexibility of determining their own mechanisms for session identification, and the firewall does not need to potentially create multiple mapping interfaces to support various types/vendors of offload devices). At stage 4, an offload device is notified of the 6-tuple to bypass. In an example implementation, the offload device is implemented using Software (e.g., XDP or DPDK), a SmartNIC 222 (e.g., using a commercially available SmartNIC, such as an Nvidia® Mellanox® BlueField®-2 or another commercially available SmartNIC can be used, such as other SmartNICs that are commercially available from vendors, such as Intel, Marvel, AMD, Pensando, and/or Netronome) as shown in FIG. 2A, and/or a switch or router. Control packets are still sent to Firewall Virtual Machine 202 (e.g., in this example implementation, all TCP control packets are sent to the firewall to ensure that the security features of the firewall are applied consistently across all sessions and offload devices). All session traffic is now sent over the offload path. At stage 5, a timer on OpenOffload Server 206 expires (e.g., after the flow is closed). Closed session and session statistics are sent to Firewall Virtual Machine 202 (e.g., to facilitate logging of offloaded session information and associated statistics at the firewall). At stage 6, Firewall Virtual Machine 202 listens on a thread for a stream of closed session updates from OpenOffload Server 206 using Session Table Lookup component 216. At stage 7, Firewall Virtual Machine 202 updates the session with packet statistics and marks the session as complete.

Figure 2B:
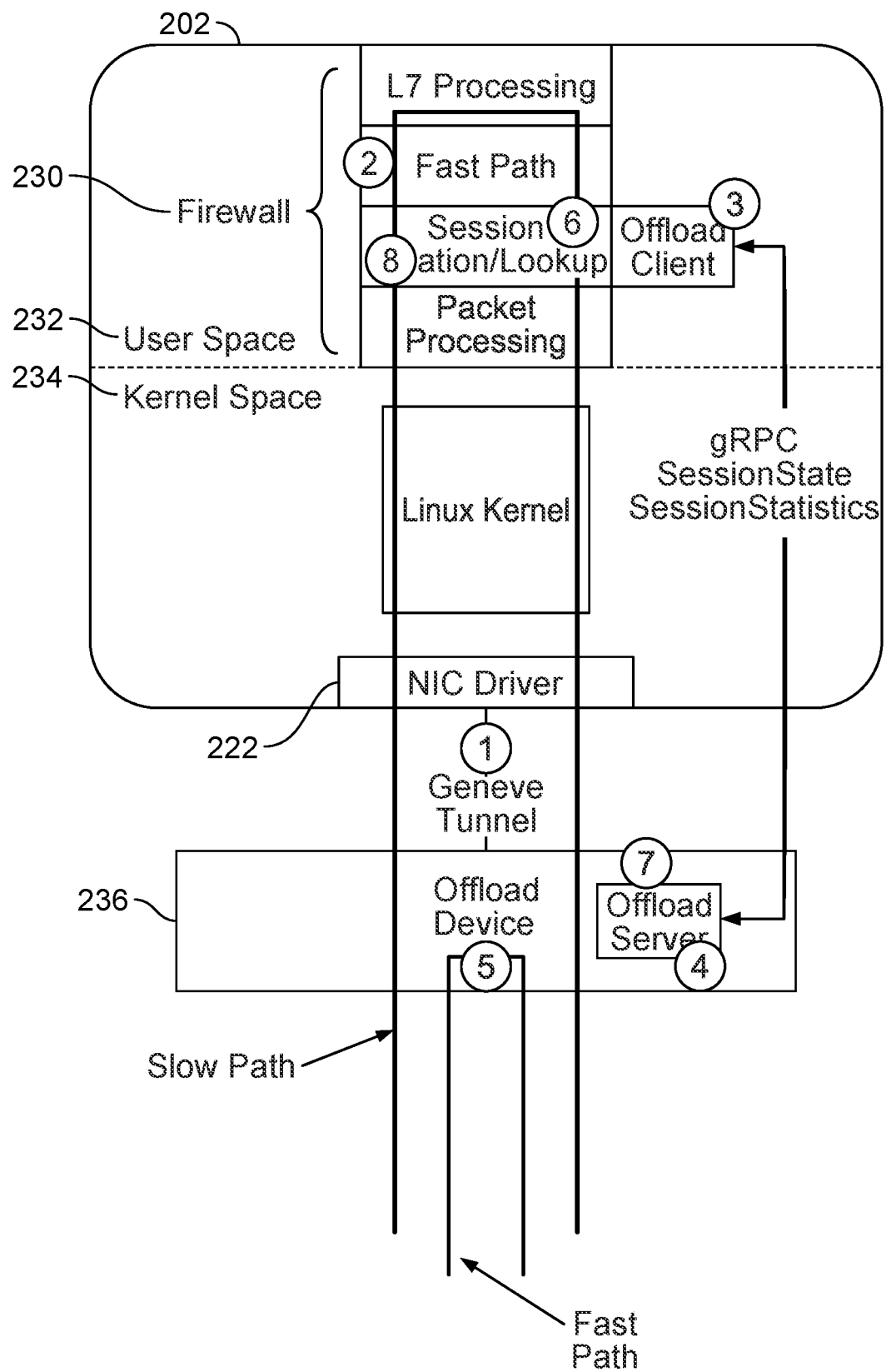
FIG. 2B is another functional block diagram of a system architecture for providing distributed offload leveraging different offload devices in accordance with some embodiments.

FIG. 2B is another functional block diagram of a system architecture for providing distributed offload leveraging different offload devices in accordance with some embodiments. As shown, a Firewall Virtual Machine 202 includes components for processing network traffic as similarly described above with respect to FIG. 2A. As shown, the Linux Kernel Networking component is in Kernel Space 234, and Firewall components 230 are in User Space 232. As also shown, an Offload Device 236 for offloading certain types of network traffic (e.g., elephant flows and/or other types of network traffic) is in secure communication with Firewall Virtual Machine 202. Specifically, FIG. 2B illustrates a network element gRPC control path and a Geneve data path using Firewall Virtual Machine 202 and Offload Device 236 as will now be described.

Referring to FIG. 2B, at 1, for a distributed network element (e.g., Offload Device 236), there is a standard Geneve tunnel that enables communication of the source/destination (src/dst) of the original flow and other metadata between the firewall (e.g., Firewall Virtual Machine 202) and the offload device (e.g., Offload Device 236). At 2, a new flow arrives at the firewall and a session is created. At 3, the flow is identified, and the firewall determines whether it is to be offloaded, and if so, the offload device is notified. At 4, the offload device applies the policy to the flow according to the policy decision of the firewall. At 5, the offload device processes all future packets, apart from control packets that continue to be sent to the firewall. At 6, when the firewall detects the flow is complete (e.g., based on control packets), then the flow is closed. At 7, the offload device session table times out and notifies the firewall with the session ID and the statistics of the flow (e.g., gRPC SessionState and SessionStatistics as shown in FIG. 2B). At 8, the firewall closes the session and updates the statistics.

Various offload devices can be used in accordance with the disclosed techniques for providing distributed offload leveraging different offload devices as will now be described with respect to FIGS. 3A-C.

Figure 3A:
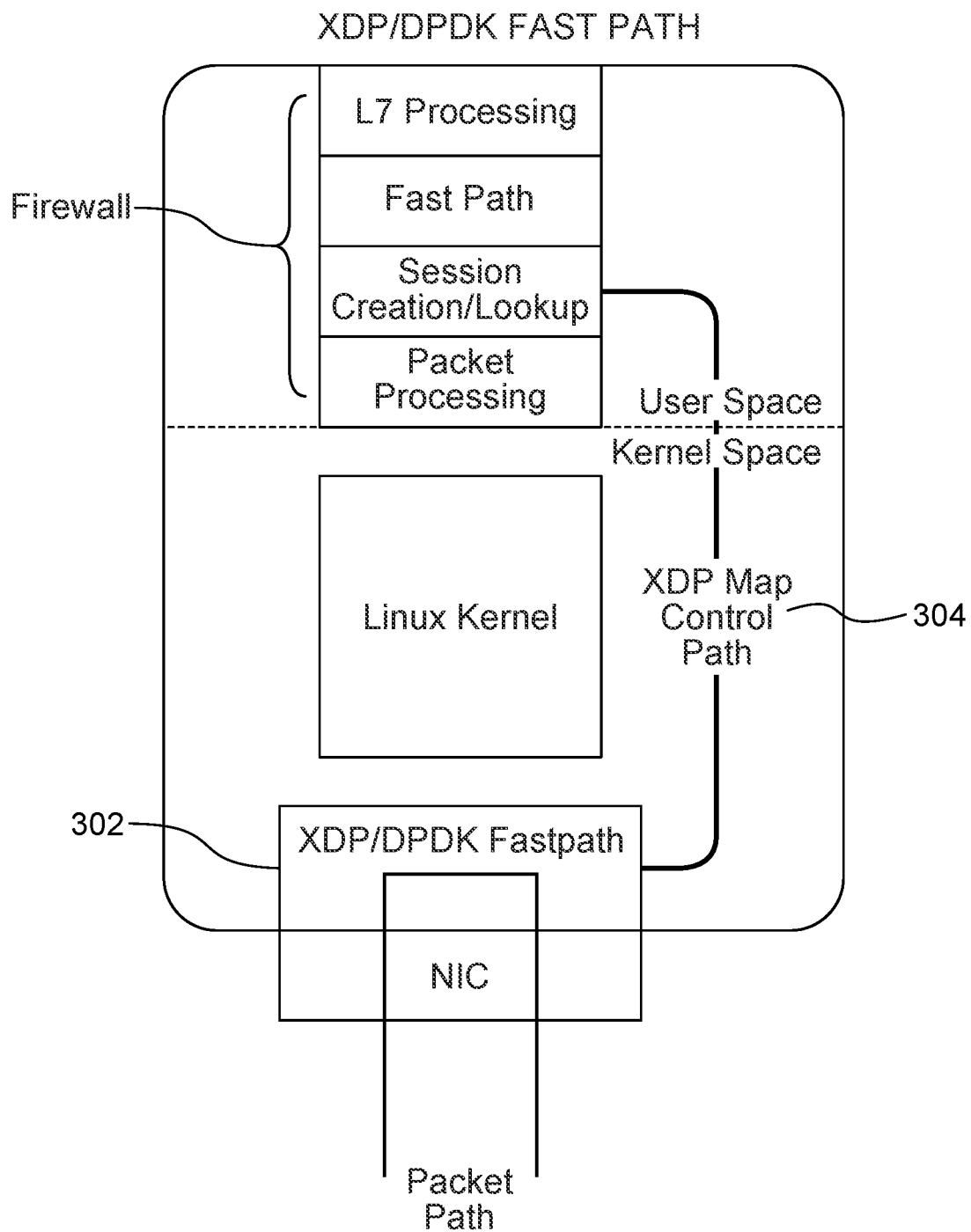
FIG. 3A is a functional block diagram of a system architecture using a software offload for providing distributed offload leveraging different offload devices in accordance with some embodiments.

FIG. 3A is a functional block diagram of a system architecture using a software offload for providing distributed offload leveraging different offload devices in accordance with some embodiments. For example, the software offload can be implemented in software executed on a network interface card (NIC). As shown, a firewall includes components in User Space for processing network traffic and a Linux Kernel in Kernel Space as similarly described above with respect to FIG. 2B. In this embodiment, the offload device for offloading certain types of network traffic (e.g., elephant flows and/or other types of network traffic) is provided using an XDP/DPDK Fastpath 302 and an XDP Map Control Path 304 as shown.

In an example implementation, the disclosed techniques for providing distributed offload leveraging different offload devices are performed using a software offload, such as an XDP/DPDK Fastpath 302 and an XDP Map Control Path 304. In this example implementation, with a virtual-based or container-based firewall (e.g., VM/CN-Series firewalls), XDP can be used to intercept the AF_PACKET (e.g., or AF_XDP_PACKET) at the XDP layer (e.g., before the Linux network stack and just after the NIC driver). As such, this uses an insignificant level of resources for packet offload as the offload is effectively handled at the XDP layer. The interaction between the firewall flow table (e.g., PAN-OS flow table for VM/CN-Series firewalls) and the offload device is implemented through XDP Maps (e.g., that can be implemented similar to the above-described open gRPC API messages with similar definitions/specifications to facilitate similar behavior between the various implementations and one set of APIs into the firewall/PAN-OS flow table and statistics).

As also discussed above, the software offload techniques can be similarly implemented using a DPDK implementation(s). For an example DPDK-based implementation, the offload device can be implemented through the DPDK Generic Flow API (e.g., that can be implemented similar to the above-described open gRPC API messages with similar definitions/specifications to facilitate similar behavior between the various implementations and one set of APIs into the firewall/PAN-OS flow table and statistics).

In an example implementation, the disclosed software (e.g., XDP/DPDK-based fastpath) solution is generally different from the hardware assist solutions as such uses host memory and CPU to perform the processing of packets and executing the offload daemon (e.g., which can provide certain limitations on scalability of such software-based solutions and is estimated to be provide approximately 50% of the offload capacity of the disclosed hardware solutions).

Figure 3B:
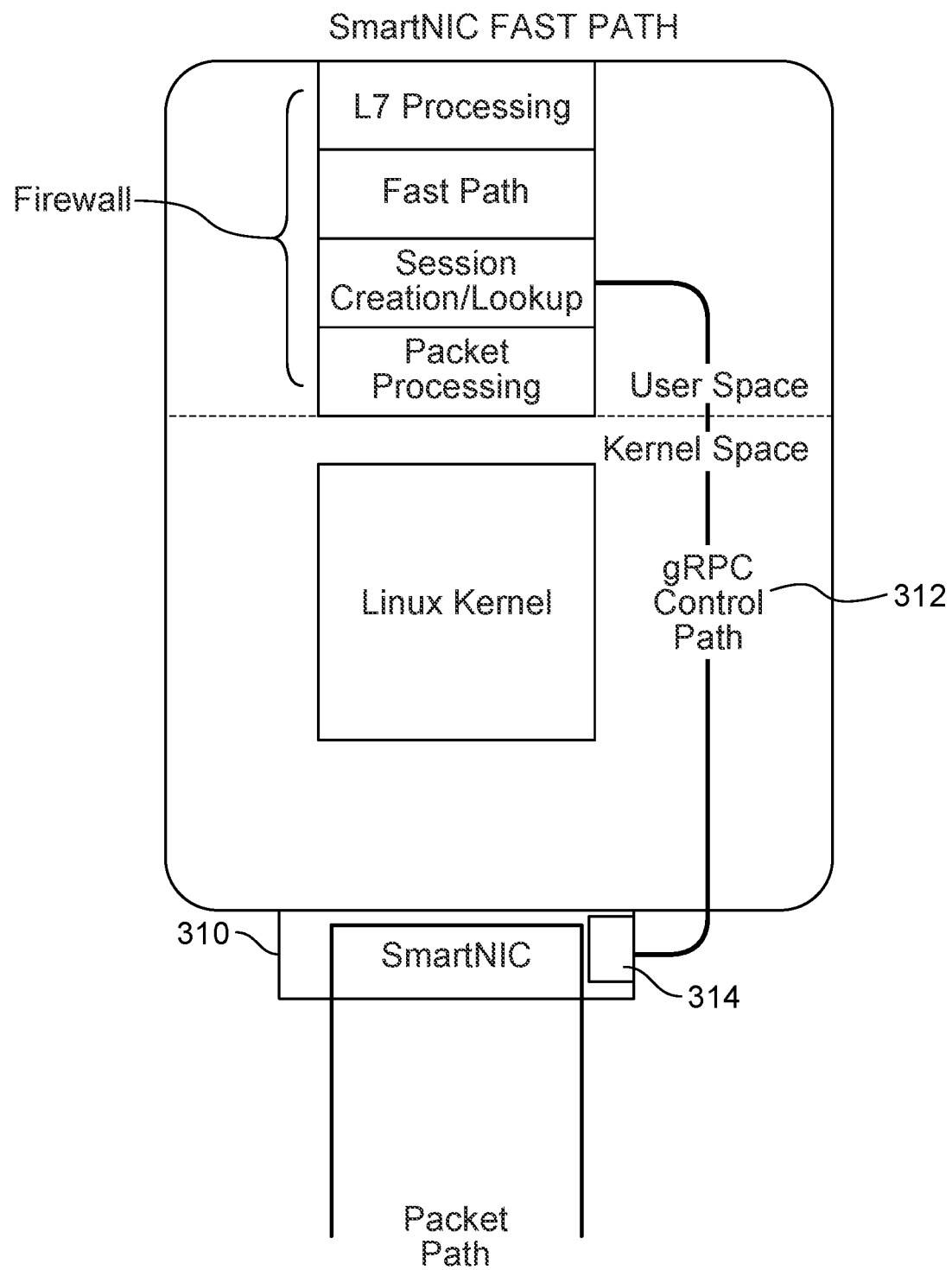
FIG. 3B is a functional block diagram of a system architecture using SmartNIC fast path for providing distributed offload leveraging different offload devices in accordance with some embodiments.

FIG. 3B is a functional block diagram of a system architecture using SmartNIC fast path for providing distributed offload leveraging different offload devices in accordance with some embodiments. As shown, a firewall includes components in User Space for processing network traffic and a Linux Kernel in Kernel Space as similarly described above with respect to FIG. 2B. In this embodiment, the offload device for offloading certain types of network traffic (e.g., elephant flows and/or other types of network traffic) is provided using a SmartNIC 310 for the Fastpath and a gRPC Control Path 312 as shown.

In an example implementation, the disclosed techniques for providing distributed offload leveraging different offload devices are performed using a SmartNIC. In this case, the offload processing and the offload session table are implemented using the SmartNIC. As shown in FIG. 3B, using the offload data path, as is shown, packets are now completely bypassing both the Linux host and the Firewall. The control path communication to the SmartNIC server is communicated over the gRPC channel to a SmartNIC server component 314 that is executed on the SmartNIC as shown in FIG. 3B. As a result, this will reduce the load on the Firewall (e.g., VM/CN-Series firewalls), and no offloaded packets will be delivered to the host. As similarly described above, the control path is implemented through a gRPC interface (e.g., an open interface to facilitate different vendors in the OpenOffload eco-system and to efficiently provide a single interface for all offload devices). In this example implementation, bidirectional authentication between the firewall and the offload device, in this case, the SmartNIC, is performed, and secure communications between the firewall and the SmartNIC are performed using Transport Layer Security (TLS) over gRPC.

In this example implementation, for TCP flows all the control packets are sent to the firewall to ensure that there is a single state machine managing the TCP flows. The SmartNIC is generally responsible for setting a timer that is checked for packet arrival, and if no packets arrive within the timer window, then the SmartNIC removes the flow from its session table and updates the firewall with the appropriate flow statistics (in/out packets and bytes) as similarly described herein. In the case of UDP flows, there are no control packets, and the timers on the SmartNIC work the same as TCP, but in this case the firewall also periodically checks that the flow exists to ensure no flow closed events are missed.

In this example implementation, SmartNIC 310 is implemented using a commercially available SmartNIC, such as an Nvidia® Mellanox® BlueField®-2 or another commercially available SmartNIC can be used, such as Marvel/LiquidIO, AMD/Alveo, Pensando/DSC, and/or Netronome/Agilio as similarly described above) In this example implementation, a session offload capacity was in the range of 700,000 to 1,000,000 sessions with a session update rate of at least 50,000 sessions per second based on testing with a SmartNIC implemented using an Nvidia® Mellanox® BlueField®-2.

Figure 3C:
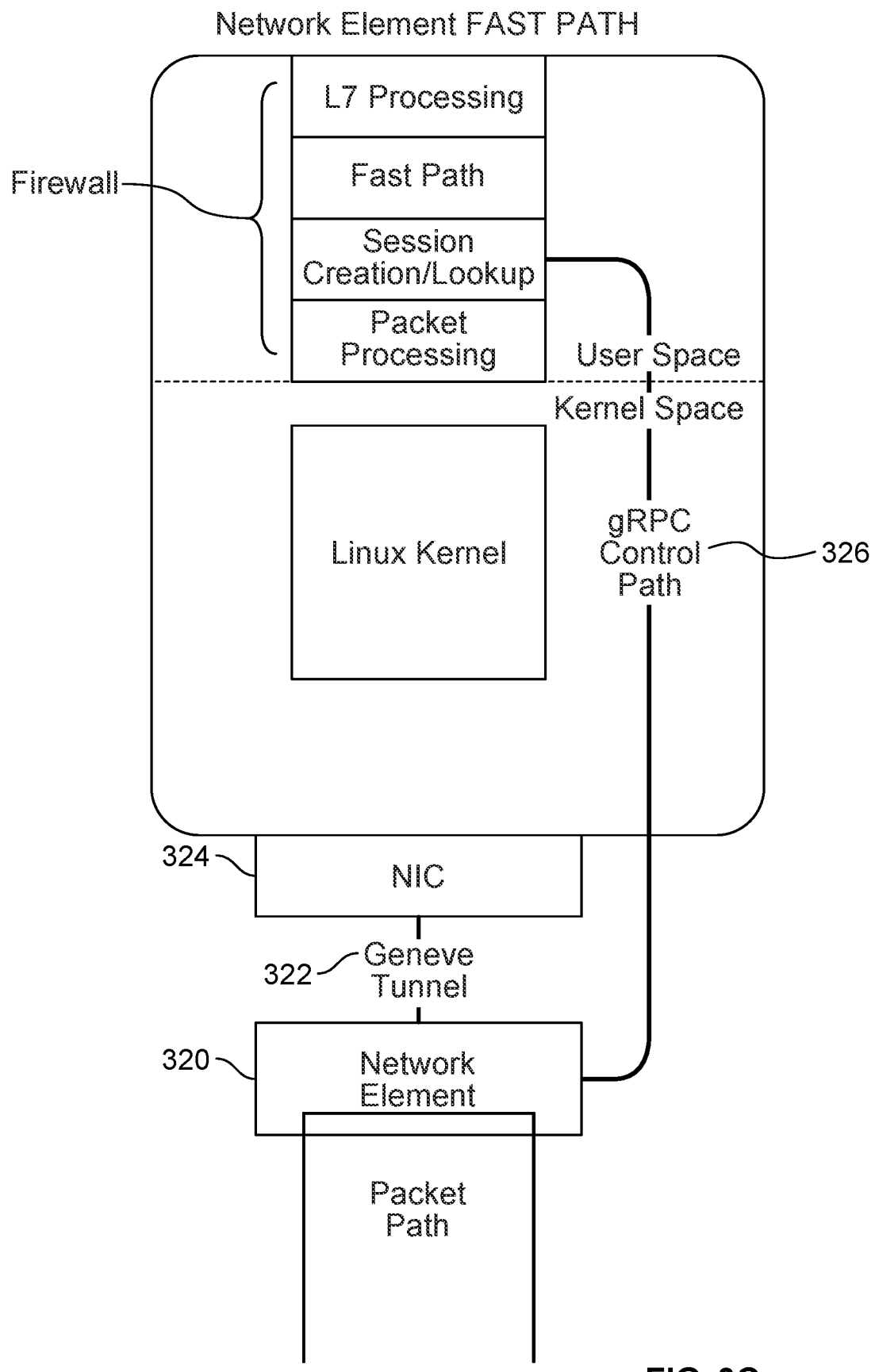
FIG. 3C is a functional block diagram of a system architecture using a network element fast path for providing distributed offload leveraging different offload devices in accordance with some embodiments.

FIG. 3C is a functional block diagram of a system architecture using a network element fast path for providing distributed offload leveraging different offload devices in accordance with some embodiments. As shown, a firewall includes components in User Space for processing network traffic and a Linux Kernel in Kernel Space as similarly described above with respect to FIG. 2B. In this embodiment, the offload device for offloading certain types of network traffic (e.g., elephant flows and/or other types of network traffic) is provided using a Network Element 320 for the Fastpath and a gRPC Control Path 326 as well as a Geneve Tunnel 322 in communication with a NIC 324 of the firewall device as shown.

In an example implementation, the disclosed techniques for providing distributed offload leveraging different offload devices are performed using a network element, such as a network switch or router with support for hardware offload from a network device (e.g., a Cisco IOS-XR or another commercially available network device can similarly be used that supports a stateful session table.).

For example, the network element implementation can also include VLAN IDs on different ingress/egress ports to facilitate the ability to provide a multi-tenant solution (e.g., which may align with certain service providers commercial business/revenue models).

Figure 4A:
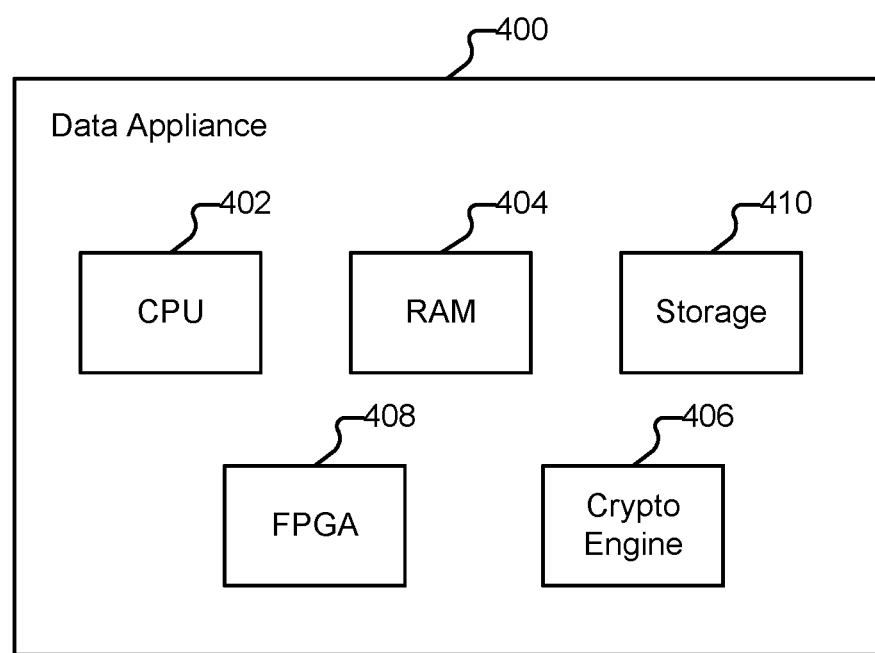
FIG. 4A is an embodiment of a data appliance.

An embodiment of data appliance 400 is shown in FIG. 4A. The example shown is a representation of physical components that can be included in network gateway 400 if the network gateway is implemented as a data appliance, in various embodiments. Specifically, the data appliance includes a high-performance multi-core Central Processing Unit (CPU) 402 and Random Access Memory (RAM) 404. The data appliance also includes a storage 410 (such as one or more hard disks or solid-state storage units). In various embodiments, the data appliance stores (whether in RAM 404, storage 410, and/or other appropriate locations) information used in monitoring an enterprise network and implementing the disclosed techniques. Examples of such information include application identifiers, content identifiers, user identifiers, requested URLs, IP address mappings, policy and other configuration information, signatures, hostname/URL categorization information, malware profiles, and machine learning models. The data appliance can also include one or more optional hardware accelerators. For example, the data appliance can include a cryptographic engine 406 configured to perform encryption and decryption operations, and one or more Field Programmable Gate Arrays (FPGAs) 408 configured to perform matching, act as network processors, and/or perform other tasks.

Functionality described herein as being performed by the data appliance can be provided/implemented in a variety of ways. For example, the data appliance can be a dedicated device or set of devices. The functionality provided by the data appliance can also be integrated into or executed as software on a general purpose computer, a computer server, a gateway, and/or a network/routing device. In some embodiments, at least some services described as being provided by the data appliance are instead (or in addition) provided to a client device (e.g., an endpoint device, such as a laptop, smart phone, etc.) by software executing on the client device.

Whenever the data appliance is described as performing a task, a single component, a subset of components, or all components of the data appliance may cooperate to perform the task. Similarly, whenever a component of the data appliance is described as performing a task, a subcomponent may perform the task and/or the component may perform the task in conjunction with other components. In various embodiments, portions of the data appliance are provided by one or more third parties. Depending on factors such as the amount of computing resources available to the data appliance, various logical components and/or features of the data appliance may be omitted, and the techniques described herein adapted accordingly. Similarly, additional logical components/features can be included in embodiments of the data appliance as applicable. One example of a component included in the data appliance in various embodiments is an application identification engine which is configured to identify an application (e.g., using various application signatures for identifying applications based on packet flow analysis). For example, the application identification engine can determine what type of traffic a session involves, such as Web Browsing—Social Networking; Web Browsing—News; SSH; and so on.

The disclosed system processing architecture can be used with different types of clouds in different deployment scenarios, such as the following: (1) public cloud; (2) private cloud on-premises; and (3) inside high-end physical firewalls. Some processing power can be allocated to execute a private cloud (e.g., using the management plane (MP) in the Palo Alto Networks PA-5200 Series firewall appliances).

Figure 4B:
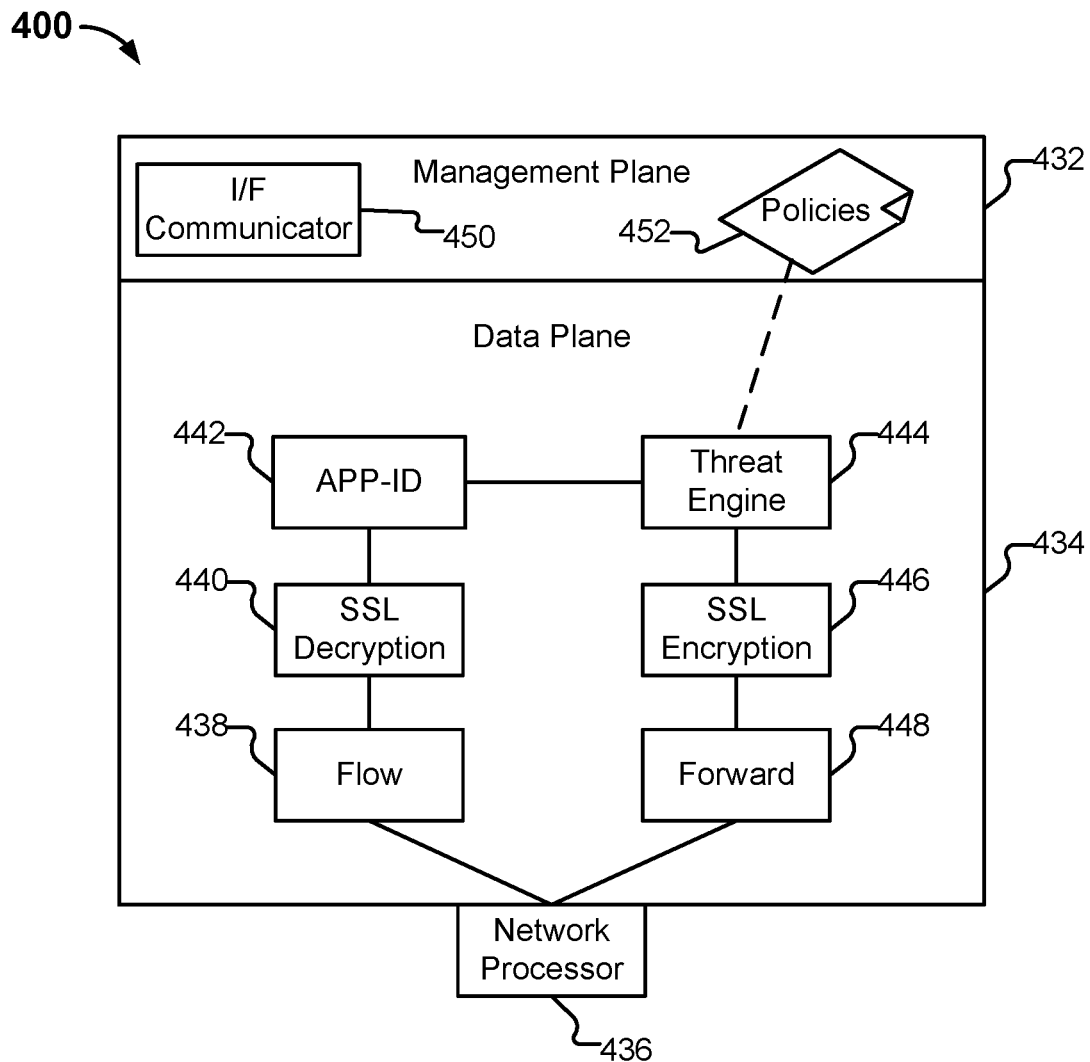
FIG. 4B is a functional diagram of logical components of an embodiment of a data appliance.

FIG. 4B is a functional diagram of logical components of an embodiment of a data appliance. The example shown is a representation of logical components that can be included in network gateway 400 in various embodiments. Unless otherwise specified, various logical components of network gateway 400 are generally implementable in a variety of ways, including as a set of one or more scripts (e.g., written in Java, python, etc., as applicable).

As shown, network gateway 400 comprises a firewall, and includes a management plane 432 and a data plane 434. The management plane is responsible for managing user interactions, such as by providing a user interface for configuring policies and viewing log data. The data plane is responsible for managing data, such as by performing packet processing and session handling.

Network processor 436 is configured to receive packets from client devices and provide them to data plane 434 for processing. Whenever flow module 438 identifies packets as being part of a new session, it creates a new session flow. Subsequent packets will be identified as belonging to the session based on a flow lookup. If applicable, SSL decryption is applied by SSL decryption engine 440. Otherwise, processing by SSL decryption engine 440 is omitted. Decryption engine 440 can help network gateway 400 inspect and control SSL/TLS and SSH encrypted traffic, and thus help to stop threats that might otherwise remain hidden in encrypted traffic. Decryption engine 440 can also help prevent sensitive content from leaving an enterprise/secured customer's network. Decryption can be controlled (e.g., enabled or disabled) selectively based on parameters such as: URL category, traffic source, traffic destination, user, user group, and port. In addition to decryption policies (e.g., that specify which sessions to decrypt), decryption profiles can be assigned to control various options for sessions controlled by the policy. For example, the use of specific cipher suites and encryption protocol versions can be required.

Application identification (APP-ID) engine 442 is configured to determine what type of traffic a session involves. As one example, application identification engine 442 can recognize a GET request in received data and conclude that the session requires an HTTP decoder. In some cases, e.g., in a web browsing session, the identified application can change, and such changes will be noted by network gateway 400. For example, a user may initially browse to a corporate Wiki (classified based on the URL visited as "Web Browsing—Productivity") and then subsequently browse to a social networking site (classified based on the URL visited as "Web Browsing—Social Networking"). Different types of protocols have corresponding decoders.

Based on the determination made by application identification (APP-ID) engine 442, the packets are sent, by threat engine 444, to an appropriate decoder configured to assemble packets (which may be received out of order) into the correct order, perform tokenization, and extract out information. Threat engine 444 also performs signature matching to determine what should happen to the packet. As needed, SSL encryption engine 446 can re-encrypt decrypted data. Packets are forwarded using a forward module 448 for transmission (e.g., to a destination).

As also shown in FIG. 4B, policies 452 are received and stored in management plane 432. Policies can include one or more rules, which can be specified using domain and/or host/server names, and rules can apply one or more signatures or other matching criteria or heuristics, such as for security policy enforcement for subscriber/IP flows based on various extracted parameters/information from monitored session traffic flows. An interface (I/F) communicator 450 is provided for management communications (e.g., via (REST) APIs, messages, or network protocol communications or other communication mechanisms).

Figure 5:
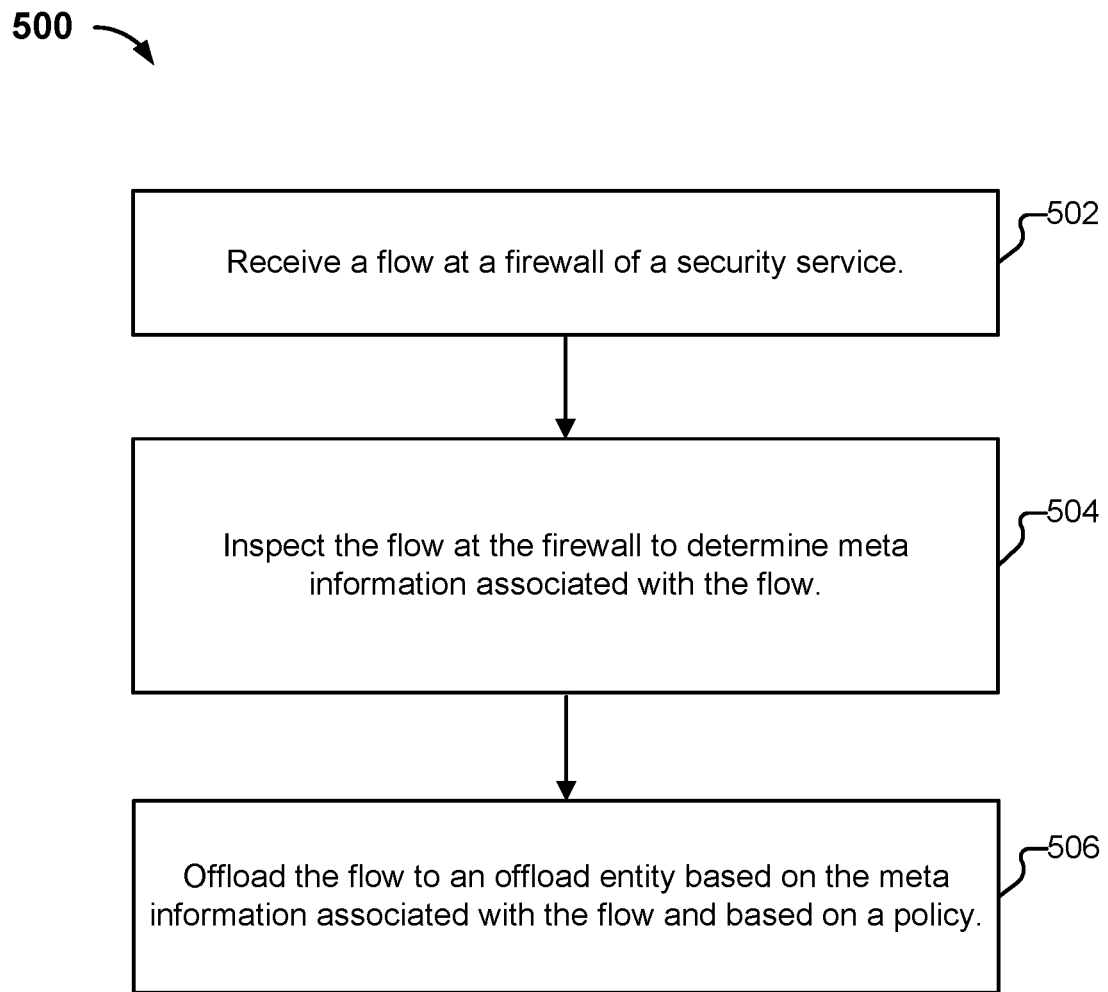
FIG. 5 is a flow diagram illustrating a process for providing distributed offload leveraging different offload devices in accordance with some embodiments.

Example Processes for Providing Distributed Offload Leveraging Different Offload Devices FIG. 5 is a flow diagram illustrating a process for providing distributed offload leveraging different offload devices in accordance with some embodiments.

In one embodiment, process 500 is performed using the system architectures described above (e.g., such as described above with respect to FIGS. 1-4B).

The process begins at 502 when a flow is received at a firewall of a security service. For example, the security service can be a cloud-based security service as similarly described above.

At 504, inspecting the flow to determine meta information associated with the flow is performed. For example, the flow can be determined to be a new flow at the firewall of the security service, and an APP-ID can be determined for the new flow using deep packet inspection (DPI) as similarly described above.

At 506, offloading the flow to an offload entity based on the meta information associated with the flow and based on a policy (e.g., an offload policy) is performed. For example, the flow (e.g., an elephant flow or another type of flow to be offloaded based on the offload policy) can be offloaded to a SmartNIC, software executed on a Network Interface Card (NIC), and/or a network device, such as a network router and/or network switch as similarly described above.

Figure 6:
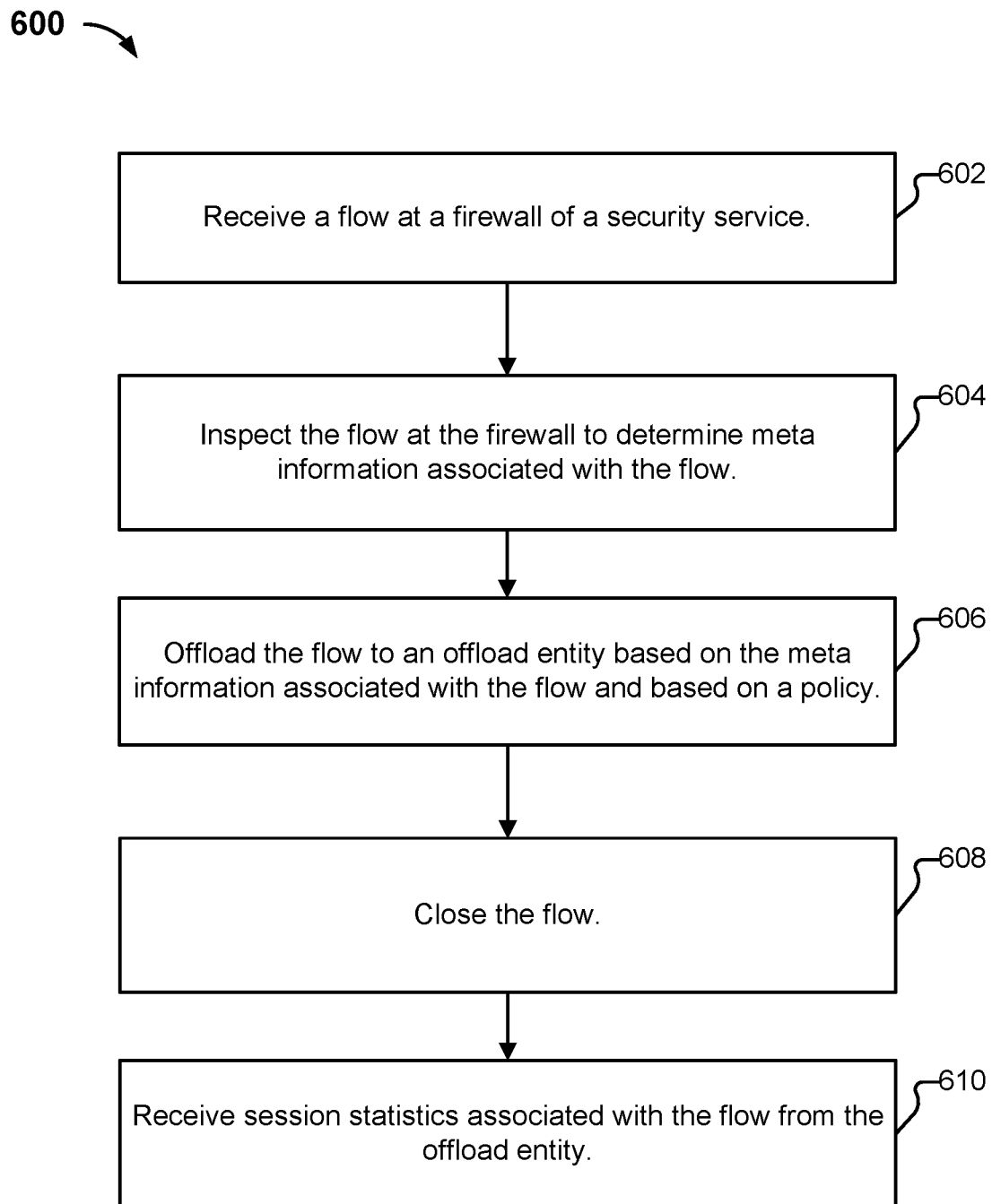
FIG. 6 is another flow diagram illustrating a process for providing distributed offload leveraging different offload devices in accordance with some embodiments.

FIG. 6 is another flow diagram illustrating a process for providing distributed offload leveraging different offload devices in accordance with some embodiments.

In one embodiment, process 600 is performed using the system architectures described above (e.g., such as described above with respect to FIGS. 1-4B).

The process begins at 602 when a flow is received at a firewall of a security service. For example, the security service can be a cloud-based security service as similarly described above.

At 604, inspecting the flow to determine meta information associated with the flow is performed. For example, the flow can be determined to be a new flow at the firewall of the security service, and an APP-ID can be determined for the new flow using deep packet inspection (DPI) as similarly described above.

At 606, offloading the flow to an offload entity based on the meta information associated with the flow and based on a policy (e.g., an offload policy) is performed. For example, the flow (e.g., an elephant flow or another type of flow to be offloaded based on the offload policy) can be offloaded to a SmartNIC, software executed on a Network Interface Card (NIC), and/or a network device, such as a network router and/or network switch as similarly described above.

At 608, the flow is closed, and at 610, session statistics associated with the flow are received from the offload entity as similarly described above.

Figure 7:
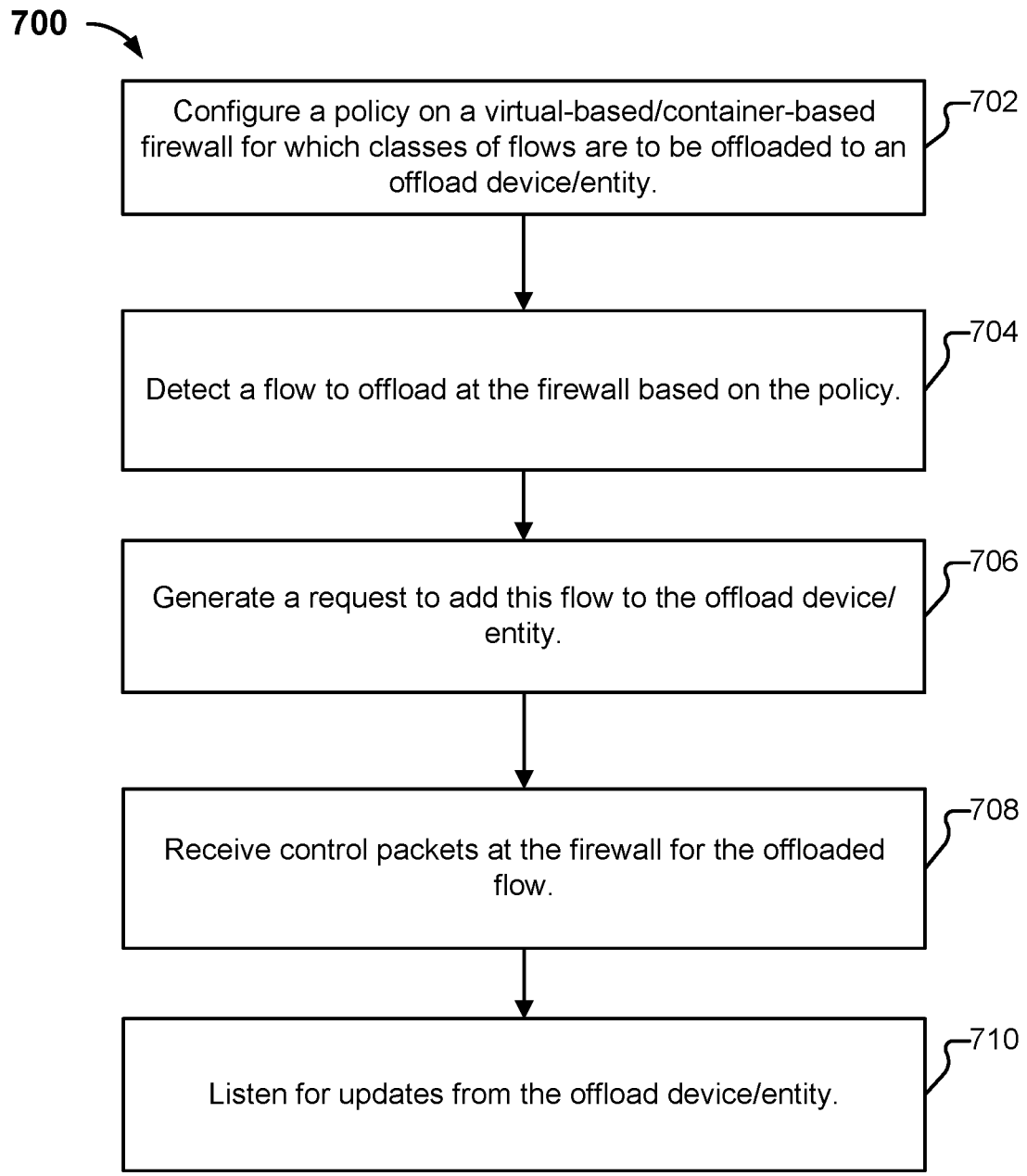
FIG. 7 is another flow diagram illustrating a process for providing distributed offload leveraging different offload devices in accordance with some embodiments.

FIG. 7 is another flow diagram illustrating a process for providing distributed offload leveraging different offload devices in accordance with some embodiments.

In one embodiment, process 700 is performed using the system architectures described above (e.g., such as described above with respect to FIGS. 1-4B).

The process begins at 702 when a policy (e.g., an offload policy) is configured on a virtual-based/container-based firewall (e.g., a VM-Series or a CN-series firewall) for which classes of flows are to be offloaded to an offload device/entity (e.g., all or a subset of the overall network traffic passing through the firewall).

At 704, detecting a flow (e.g., session) to offload at the firewall based on the policy is performed as similarly described above.

At 706, generating a request (e.g., a gRPC call) to add this flow to the offload device/entity is performed as similarly described above.

At 708, control packets are received at the firewall for the offloaded flow (e.g., the firewall continues to receive control packets for the offloaded session, and the session will be closed normally) as similarly described above.

At 710, listening for updates from the offload device/entity is performed (e.g., to receive session table updates and session statistics for updating network traffic logs at the firewall) as similarly described above.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system comprising:
a processor configured to:
receive a flow at a firewall of a security service;
inspect the flow at the firewall to determine meta information associated with the flow; and
offload the flow that is Layer-7 (L7) complete to an offload entity based on the meta information associated with the flow and based on a policy, wherein the policy is configured to offload passthrough traffic encrypted network traffic in a service provider network, and wherein the encrypted network traffic includes Secure Shell protocol (SSH), Sockets Layer (SSL) protocol, and/or Internet Protocol Security (IPSEC) protocol associated network traffic in the service provider network in which the service provider does not have a decryption key to inspect the encrypted network traffic; and
a memory coupled to the processor and configured to provide the processor with instructions.

2. The system recited in claim 1, wherein the flow is determined to be a new flow at the firewall of the security service, and wherein the meta information includes an application identification associated with the flow.

3. The system recited in claim 1, wherein the meta information includes an application identification associated with the flow determined using deep packet inspection.

4. The system recited in claim 1, wherein the offload entity includes a Smart Network Interface Card (SmartNIC).

5. The system recited in claim 1, wherein the offload entity is implemented in software executed on a network interface card (NIC).

6. The system recited in claim 1, wherein the offload entity includes a network router or a network switch.

7. The system recited in claim 1, wherein the security service is a cloud-based security service.

8. The system recited in claim 1, wherein the security service is a cloud-based security service that is provided using a public cloud service provider.

9. The system recited in claim 1, wherein the security service is a cloud-based security service that is provided using a plurality of public cloud service providers.

10. The system recited in claim 1, wherein the processor is further configured to:
close the flow; and
receive session statistics associated with the flow from the offload entity.

11. A method, comprising:
receiving a flow at a firewall of a security service;
inspecting the flow at the firewall to determine meta information associated with the flow; and
offloading the flow that is Layer-7 (L7) complete to an offload entity based on the meta information associated with the flow and based on a policy, wherein the policy is configured to offload passthrough traffic encrypted network traffic in a service provider network, and wherein the encrypted network traffic includes Secure Shell protocol (SSH), Sockets Layer (SSL) protocol, and/or Internet Protocol Security (IPSEC) protocol associated network traffic in the service provider network in which the service provider does not have a decryption key to inspect the encrypted network traffic.

12. The method of claim 11, wherein the flow is determined to be a new flow at the firewall of the security service, and wherein the meta information includes an application identification associated with the flow.

13. The method of claim 11, wherein the meta information includes an application identification associated with the flow determined using deep packet inspection.

14. The method of claim 11, wherein the offload entity includes a Smart Network Interface Card (SmartNIC).

15. The method of claim 11, wherein the offload entity is implemented in software executed on a network interface card (NIC).

16. The method of claim 11, wherein the offload entity includes a network router or a network switch.

17. The method of claim 11, further comprising:
closing the flow; and
receiving session statistics associated with the flow from the offload entity.

18. A non-transitory tangible computer readable storage medium embodying computer instructions for:
receiving a flow at a firewall of a security service;
inspecting the flow at the firewall to determine meta information associated with the flow; and
offloading the flow that is Layer-7 (L7) complete to an offload entity based on the meta information associated with the flow and based on a policy, wherein the policy is configured to offload passthrough traffic encrypted network traffic in a service provider network, and wherein the encrypted network traffic includes Secure Shell protocol (SSH), Sockets Layer (SSL) protocol, and/or Internet Protocol Security (IPSEC) protocol associated network traffic in the service provider network in which the service provider does not have a decryption key to inspect the encrypted network traffic.

19. The non-transitory tangible computer readable storage medium recited in claim 18, wherein the flow is determined to be a new flow at the firewall of the security service, and wherein the meta information includes an application identification associated with the flow.

20. The non-transitory tangible computer readable storage medium recited in claim 18, wherein the meta information includes an application identification associated with the flow determined using deep packet inspection.

* * * * *

UNITED STATES PATENT AND TRADEMARK OFFICE
CERTIFICATE OF CORRECTION

| | |
|---|---|
| PATENT NO. | : 11,665,139 B2 |
| APPLICATION NO. | : 17/246160 |
| DATED | : May 30, 2023 |
| INVENTOR(S) | : John Edward McDowall, James Sugg and Charles Bransi |

It is certified that error appears in the above-identified patent and that said Letters Patent is hereby corrected as shown below:

In the Specification

In Column 8, Line 19, delete "indicated" and insert --indicate--, therefor.

Signed and Sealed this
Twenty-first Day of November, 2023

Katherine Kelly Vidal
*Director of the United States Patent and Trademark Office*